(12) United States Patent
Rudrapatna

(10) Patent No.: US 7,676,240 B2
(45) Date of Patent: Mar. 9, 2010

(54) POWER CONTROL BASED ON ESTIMATES OF CUMULATIVE RECEIVED ENERGY

(75) Inventor: Ashok R. Rudrapatna, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 755 days.

(21) Appl. No.: 11/067,816

(22) Filed: Feb. 28, 2005

(65) Prior Publication Data

US 2006/0194602 A1 Aug. 31, 2006

(51) Int. Cl.
*H04B 7/00* (2006.01)
(52) U.S. Cl. .............. 455/522; 455/553.1; 455/519; 455/518; 455/517; 455/414.1; 455/414.2
(58) Field of Classification Search .......... 455/522, 455/523, 518, 519
See application file for complete search history.

(56) References Cited

U.S. PATENT DOCUMENTS

| | | | | |
|---|---|---|---|---|
| 6,636,746 | B1 * | 10/2003 | Hashem et al. | 455/522 |
| 6,735,451 | B1 * | 5/2004 | Jarleholm et al. | 455/561 |
| 2001/0046213 | A1 * | 11/2001 | Sakoda | 370/328 |
| 2003/0022685 | A1 * | 1/2003 | Nilsson | 455/522 |
| 2003/0128836 | A1 * | 7/2003 | Stephens et al. | 379/399.01 |
| 2003/0152135 | A1 * | 8/2003 | Cramer, III | 375/140 |
| 2004/0193971 | A1 * | 9/2004 | Soong et al. | 714/704 |

* cited by examiner

*Primary Examiner*—Matthew D Anderson
*Assistant Examiner*—Adel Youssef
(74) *Attorney, Agent, or Firm*—Williams, Morgan & Amerson, PC

(57) ABSTRACT

The present invention provides a method for power control based on estimates of cumulative received energy. The method includes accessing a plurality of slot detection metrics associated with a plurality of slots, combining the plurality of slot detection metrics, and determining a power control instruction based upon the combined slot detection metrics.

25 Claims, 4 Drawing Sheets

POWER CONTROL BASED ON ESTIMATES OF CUMULATIVE RECEIVED ENERGY

BACKGROUND OF THE INVENTION

1. Field of the Invention

This invention relates generally to telecommunication systems, and, more particularly, to wireless telecommunication systems.

2. Description of the Related Art

The transmission power used to transmit symbols over an air interface, e.g., the air interface between a mobile unit and a base station (or a base station and a mobile unit) in a wireless telecommunication system, is typically determined by balancing competing constraints. For example, increasing the transmission power may reduce a bit error rate associated with transmissions over the air interface. However, increasing the transmission power may also increase system interference between mobile units and/or base stations. Increasing the transmission power of a transmitter in a mobile unit may also reduce the operational lifetime of a battery in the mobile unit. Thus, the transmission power may be selected to balance the competing desires for a low bit error rate, low system interference, long battery life, and increased system capacity. In order to maintain a proper balance between these competing factors, it is desirable to maintain a constant received power at the receiver.

The path loss between the transmitter and the receiver in a mobile wireless environment varies with time. This time varying nature is caused by fading inherent to a terrestrial wireless channel (commonly referred to as fast fading), or due to distance between the transmitter and receiver, or due to shadow obstructions. Thus under proper control, the optimal transmission power typically varies over time to compensate for the time-varying path loss. For example, the transmission power of a transmitter in a mobile unit and/or a base station may be continually increased to maintain an acceptable bit error rate as the mobile unit moves away from the base station, even though this may result in reduced battery life and/or increased system interference. Thus, closed loop power control systems may be used to control the transmission power of transmitters in wireless telecommunication systems. In a typical closed loop power control system, such as may be implemented in wireless telecommunications systems that operate in accordance with TDMA, IEEE 802.xx, CDMA 2000 and/or UMTS protocols, feedback information is sent from a receiver to a transmitter at regular intervals. For example, the transmission power associated with slots in a frame may be controlled using a single power control bit that may be transmitted once per slot. The power control bit may instruct the transmitter to either reduce or increase the transmitted power for the next slot, depending upon a signal-to-noise ratio associated with a received signal, such as a pilot or traffic signal.

In one conventional technique, the value of the power control bit is determined by comparing a signal-to-noise ratio associated with a received signal to a reference value, sometimes referred to as a set point. For example, a ratio of the signal energy to a noise power spectral density ($E_c/N_t$) for a received pilot or traffic signal may be compared to a reference value of $E_c/N_t$. The power control bit may then be set to instruct the transmitter to reduce the transmitted power when $E_c/N_t$ is larger than the reference value and to increase the transmitted power when $E_c/N_t$ is less than the reference value. For another example, the chip energy ($E_c$) for a received pilot or traffic signal may be compared to a reference value of the chip energy $E_c$. The power control bit may then be set to instruct the transmitter to reduce the transmitted power when $E_c$ is larger than the reference value and to increase the transmitted power when $E_c$ is less than the reference value.

The conventional power control technique described above is strictly temporally-local and bimodal. If the received value of $E_c/N_t$ (or $E_c$) during the immediate previous slot is larger than the set point, then a power down command is transmitted to the transmitter via a power control channel. If the received value of $E_c/N_t$ (or $E_c$) during the immediate previous slot is smaller than the set point, then a power up command is transmitted to the transmitter via a power control channel. The transmitter then applies a predetermined power correction (sometimes also referred to as a step size) of a fixed value to compensate for the excess or deficient received power in a fading channel. For example, the transmitter may apply a step size of 0.5 or 1 decibels. The same step size is applied regardless of how far the received value of $E_c/N_t$ (or $E_c$) deviates from the set point (i.e. the technique is bimodal). Furthermore, the value of the power control bit is strictly based on information associated with only the immediate previous slot (i.e. the technique is temporally-local).

Coded transmission using temporally-local and/or bimodal power control techniques may use more power than is needed to achieve the desired performance. The inefficiencies in the temporally-local and/or bimodal power control system may be caused by temporal channel variations in wireless telecommunication systems, insufficient granularity and/or step-size in the allowable levels of transmitted power, latencies in the power control loop, errors in the estimation of $E_c/N_t$, and the like. Consequently, closed loop power control may result in unnecessarily large system interference, system capacity waste, and reduced battery life.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for power control based on estimates of cumulative received energy. The method includes accessing a plurality of slot detection metrics associated with a plurality of slots, combining the plurality of slot detection metrics, and determining a power control instruction based upon the combined slot detection metrics.

In another embodiment of the present invention, a method is provided for power control based on estimates of cumulative received energy. The method includes accessing a plurality of ratios of chip energy to noise power spectral density. The chip energy and the noise power spectral density in each ratio are associated with a corresponding one of a plurality of slots received in a current frame. The method also includes combining the plurality of ratios and determining a power control instruction based upon the combined ratios.

BRIEF DESCRIPTION OF THE DRAWINGS

The invention may be understood by reference to the following description taken in conjunction with the accompanying drawings, in which like reference numerals identify like elements, and in which.

Figure 1:
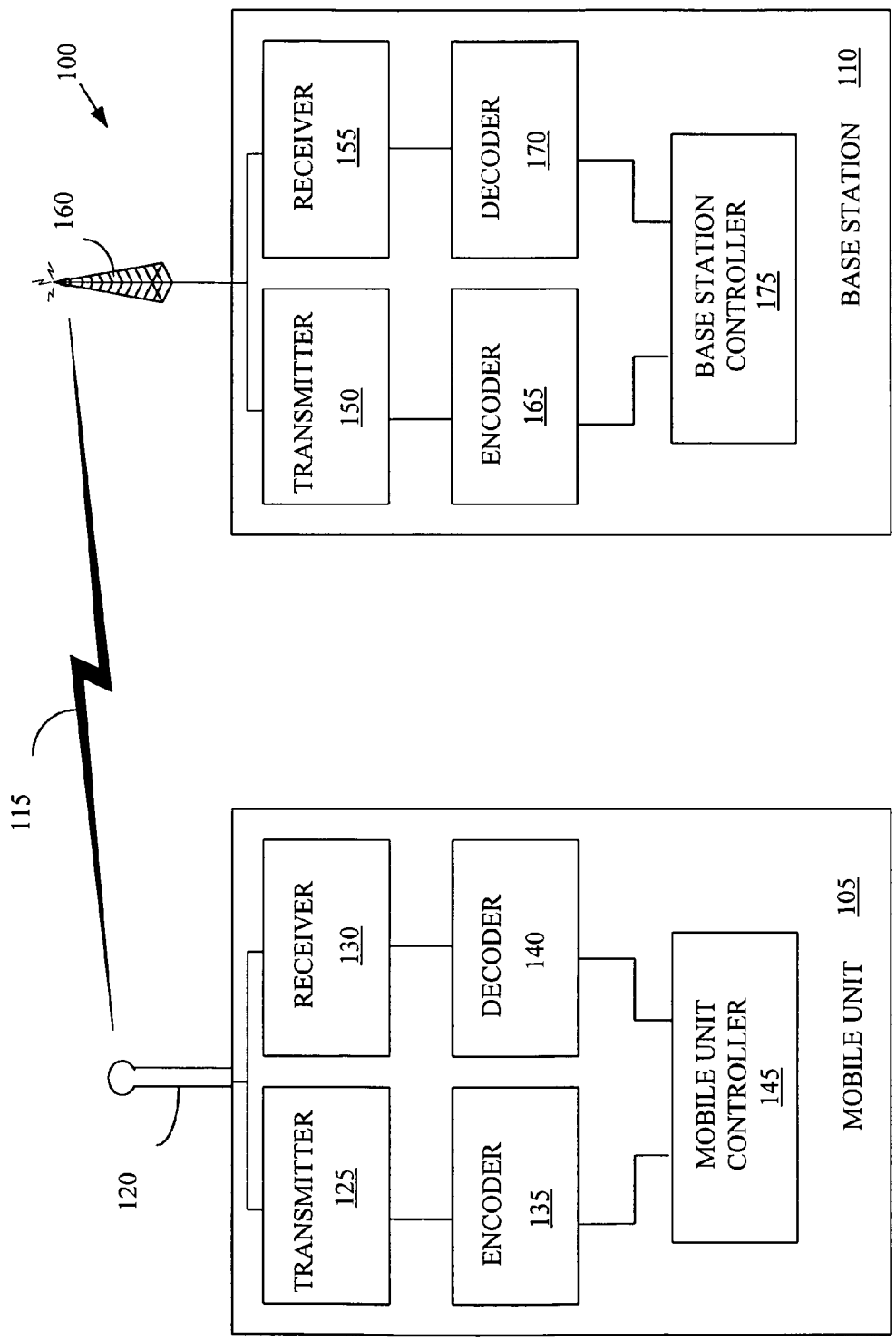
FIG. 1 shows a wireless telecommunication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, a wireless telecommunication system 100 is shown. The wireless telecommunications system 100 includes a mobile unit 105 and a base station 110. In various alternative embodiments, the mobile unit 105 may be a cellular telephone or any other desirable device including a personal computer, a laptop computer, a personal data assistant, and the like. Moreover, in alternative embodiments, the base station 110 may be an access point, a relay, and the like. The mobile unit 105 and the base station 110 communicate using a wireless telecommunications link 115. In accordance with common usage in the art, the wireless telecommunications link 115 will be referred to hereinafter as the air interface 115.

The mobile unit 105 and the base station 110 exchange messages across the air interface 115 according to various protocols. For example, the mobile unit 105 and the base station 110 may exchange messages according to a Universal Mobile Telephone System (UMTS) protocol, a Code Division Multiple Access 2000 (CDMA 2000) protocol, a Global System for Mobile Telecommunications (GSM) protocol, and the like. However, the mobile unit 105 and the base station 110 are not limited to the aforementioned protocols. In alternative embodiments, any desirable wireless telecommunication protocol may be used to exchange messages across the air interface 115. For example, the air interface 115 may operate according to a Bluetooth protocol, an IEEE 802.11 protocol, and the like. As should be appreciated by persons of ordinary skill in the art, the messages include a variety of signaling and/or data messages that may be transmitted in various types of frames or blocks. For example, a Radio Layer Protocol (RLP) includes control frames, data frames, fill frames, and idle frames.

The mobile unit 105 includes at least one antenna 120 that is coupled to a transmitter 125 and a receiver 130. The transmitter 125 is coupled to an encoder 135 and the receiver 130 is coupled to a decoder 140, and the encoder 135 and the decoder 140 are coupled to a mobile unit controller 145. In the illustrated embodiment, the transmitter 125, the receiver 130, the encoder 135, the decoder 140, and the mobile unit controller 145 are depicted as separate elements. However, persons of ordinary skill in the art should appreciate that the present invention is not so limited. In alternative embodiments, portions of the transmitter 125, the receiver 130, the encoder 135, the decoder 140, and/or the mobile unit controller 145 may be combined into a single element or may be incorporated into other portions of the mobile unit 105. Furthermore, the mobile unit 105 may include other elements not shown in FIG. 1.

The base station 110 includes a transmitter 150 and a receiver 155, which are both coupled to at least one antenna, such as the radio station tower 160. The transmitter 150 and the receiver 155 are coupled to an encoder 165 and a decoder 170, respectively. The encoder 165 and the decoder 170 are coupled to a base station controller 175. In the illustrated embodiment, the transmitter 150, the receiver 155, the encoder 165, the decoder 170, and the base station controller 175 are depicted as separate elements. However, persons of ordinary skill in the art should appreciate that a present invention is not so limited. In alternative embodiments, portions of the transmitter 150, the receiver 155, the encoder 165, the decoder 170, and/or the base station controller 175 may be combined into a single element or may be incorporated into other portions of the base station 110. Furthermore, the base station 110 may include other elements not shown in FIG. 1.

In operation, the mobile unit controller 145 may provide a message to the encoder 135, which may encode the message according to any desirable encoding algorithm, such as a Turbo encoding algorithm. The encoded message includes one or more blocks or frames having a plurality of slots. The frames are then provided to the transmitter 125 which may transmit the information in each slot over the air interface 115 using the antenna 120. The information in a slot may also be received using the antenna 120 and the receiver 130. The information in the received slots is provided to the decoder 140, which may decode the received frame using information in each slot. For example, the received symbols may be decoded using a Viterbi decoding algorithm. In one embodiment, the decoder 140 may provide one or more soft decision metrics indicative of the likelihood that the frame was successfully decoded. Persons of ordinary skill in the art should appreciate that the present invention is not limited to Viterbi encoding and/or decoding and, in alternative embodiments, any desirable encoding/decoding technique and/or algorithm may be used.

The base station 110 may also transmit and/or receive messages. In the illustrated embodiment, messages to be transmitted may be provided by the base station controller 175, encoded by the encoder 165 to form one or more frames including a plurality of slots, and then transmitted over the air interface 115 by the transmitter 150 using the radio tower 160. Messages may also be received by the radio tower 160 and the receiver 155. The received frame may then be decoded by the decoder 170 and provided to the base station controller 175. In one embodiment, the decoder 170 may provide one or more soft decision metrics indicative of the likelihood that the frame was successfully decoded. As discussed above, any desirable encoding and/or decoding technique or algorithm may be used by the base station 110.

Figure 2:
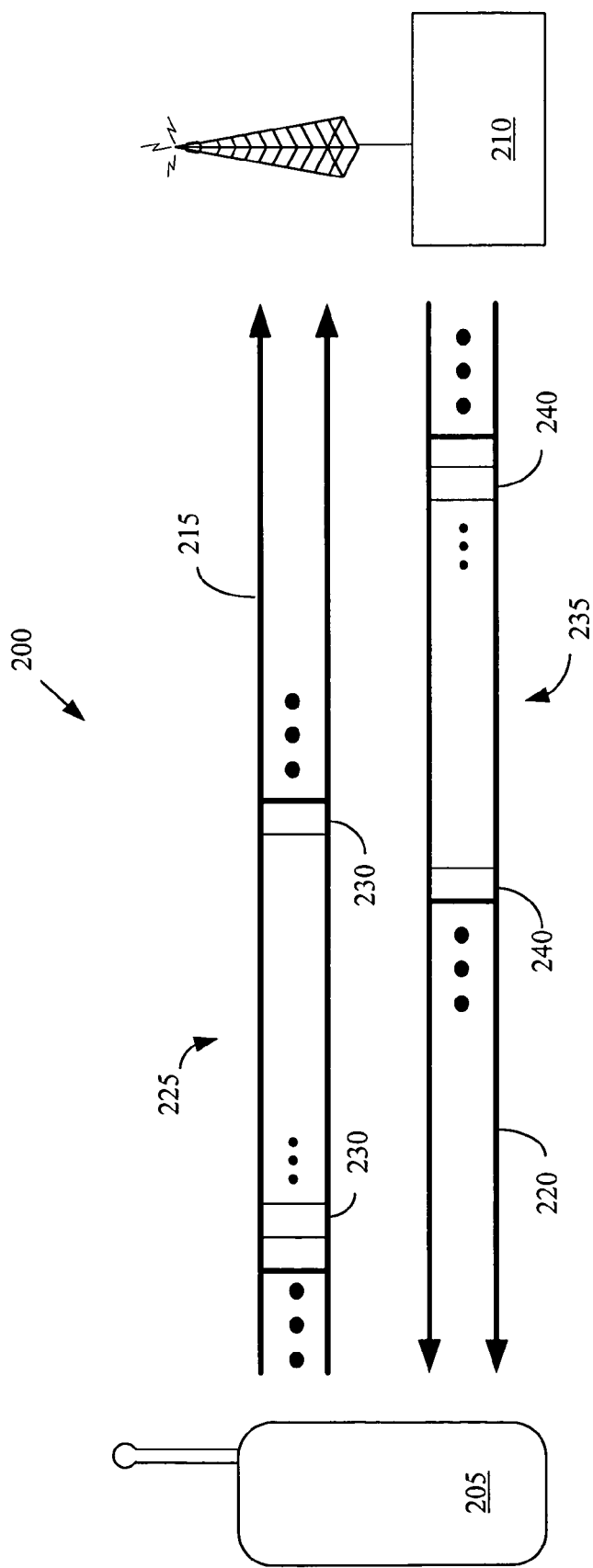
FIG. 2 conceptually illustrates an air interface between a mobile unit and a base station, in accordance with the present invention.

FIG. 2 conceptually illustrates an air interface 200 between a mobile unit 205 and a base station 210. Two traffic channels 215, 220 are shown in the embodiment illustrated in FIG. 2. However, persons of ordinary skill in the art should appreciate that the present invention is not limited to the air interface 200 including two traffic channels 215, 220. In alternative embodiment, the air interface 200 may include any desirable number of channels, including additional traffic channels, control channels, paging channels, random access channels, and the like. In the illustrated embodiment, the traffic channel 215 is transmitting a frame 225 from the mobile unit 205 to the base station 210. The frame 225 includes a plurality of slots 230. The traffic channel 220 is transmitting a frame 235 from the base station 210 to the mobile unit 205. The frame 235 includes a plurality of slots 240.

The probability that a frame 225, 235 can be successfully received and/or decoded may depend on a variety of factors. For example, the probability that the frame 225, 235 was successfully received and/or decoded may depend on the frame-received energy. For another example, the probability that the frame 225, 235 was successfully decoded may be indicated by a soft decision metrics provided by the decoders 140, 170, shown in FIG. 1. However, persons of ordinary skill in the art should appreciate that the above examples are intended to be illustrative and not to limit the present invention.

Referring back to FIG. 1, the mobile unit controller 145 and/or the base station controller 175 may form and/or access one or more slot detection metrics associated with slots in a received frame. As used herein, the term "slot detection metric" refers to a quantity indicative of a likelihood of successfully detecting and/or decoding a received frame based on one or more received slots. Slot detection metrics are formed based on information carried in at least one slot of the frame that is currently being received. For example, the slot detection metric may be a ratio of the chip energy to a noise power spectral density ($E_c/N_t$), which may be determined using information associated with a slot included in a current frame of a pilot or traffic signal. For another example, the slot detection metric may be a soft decision metric provided by decoders 140, 170 as they are attempting to decode the current frame. However, persons of ordinary skill in the art should appreciate that the present invention is not limited to the slot detection metrics such as $E_c/N_t$ and the soft decision metrics. In alternative embodiments, any desirable slot detection metric, such as a chip energy, may be used.

In one embodiment, the likelihood of successfully detecting and/or decoding the received frame may be determined based upon a predetermined threshold value of the slot detection metric. The predetermined threshold value may also be referred to as a reference value or set point, in accordance with common usage in the art. If the value of the slot detection metric is larger than the set point, then the likelihood of successfully detecting and/or decoding the received symbol may be high. For example, the threshold value of $E_c/N_t$ (also referred to hereinafter as a set-point) may be selected so that an expected bit-error-rate associated with the received symbol and/or message is below a predetermined level. For another example, when a decoder 140, 170 provides a soft decision metric that is approximately equal to or greater than the threshold value of the soft decision metric, the decoder may be at least about 99% confident that the frame and/or message has been successfully decoded. Persons of ordinary skill in the art should appreciate that the specific threshold values and/or criteria for determining the threshold values are intended to be illustrative and not to limit the present invention.

As discussed above, conventional temporally local and/or bimodal power control techniques use slot detection metrics associated with a single most recent slot in the current frame. However, the likelihood of successfully detecting and/or decoding the current frame may be estimated more accurately using a plurality of slot detection metrics associated with a plurality of slots in the current frame. For example, within a current frame, the probability of successfully detecting and/or decoding the current frame is more strongly correlated with the cumulative received Signal to Interference+Noise Ratio (SINR) than the cumulative received SINR associated only with the most recent slot. Thus, the cumulative value of the ratio of the received chip energy to noise power spectral density ($E_c/N_t$) may provide a better estimate of the probability of successfully detecting and/or decoding the current frame. For another example, the decoders 140, 170 typically utilize all of the slots received in the current frame to decode the frame. Accordingly, a combination of the soft decision metrics in a plurality of received slots may provide a more accurate estimate of the probability of successfully decoding the current frame.

In one alternative embodiment, the slot detection metric may be a $\{\log(1+E_c/N_t)\}$ metric. In this embodiment, both the set-point threshold and the accumulation use the $\{\log(1+\text{SINR})\}$ domain and the comparisons and decision are done in this domain. One benefit of this approach is that it better matches the Shannon channel capacity formulation. A illustrative formulation is:

$$\sum_{i=0}^{n} \{\log(1 + (E_c/N_t)_i^r)\} \leq [\{\log(1 + (E_c/N_t)_i^s)\} \times n],$$

Then $PC_{(n+1)} = 1$. Else $PC_{(n+1)} = 0$

In various embodiment of the power control techniques described herein, a plurality of slot detection metrics associated with a plurality of slots are accessed. For example, the mobile unit controller 145 and/or the base station controller 175 may form or access a plurality of slot detection metrics associated with a plurality of slots in the current frame including a ratio of chip energy to noise spectral energy density, a soft decision metric, and the like. The mobile unit controller 145 and/or the base station controller 175 may then combine the plurality of slot detection metrics and determine a power control instruction based upon the combined slot detection metrics, as will be discussed in detail below.

Figure 3:
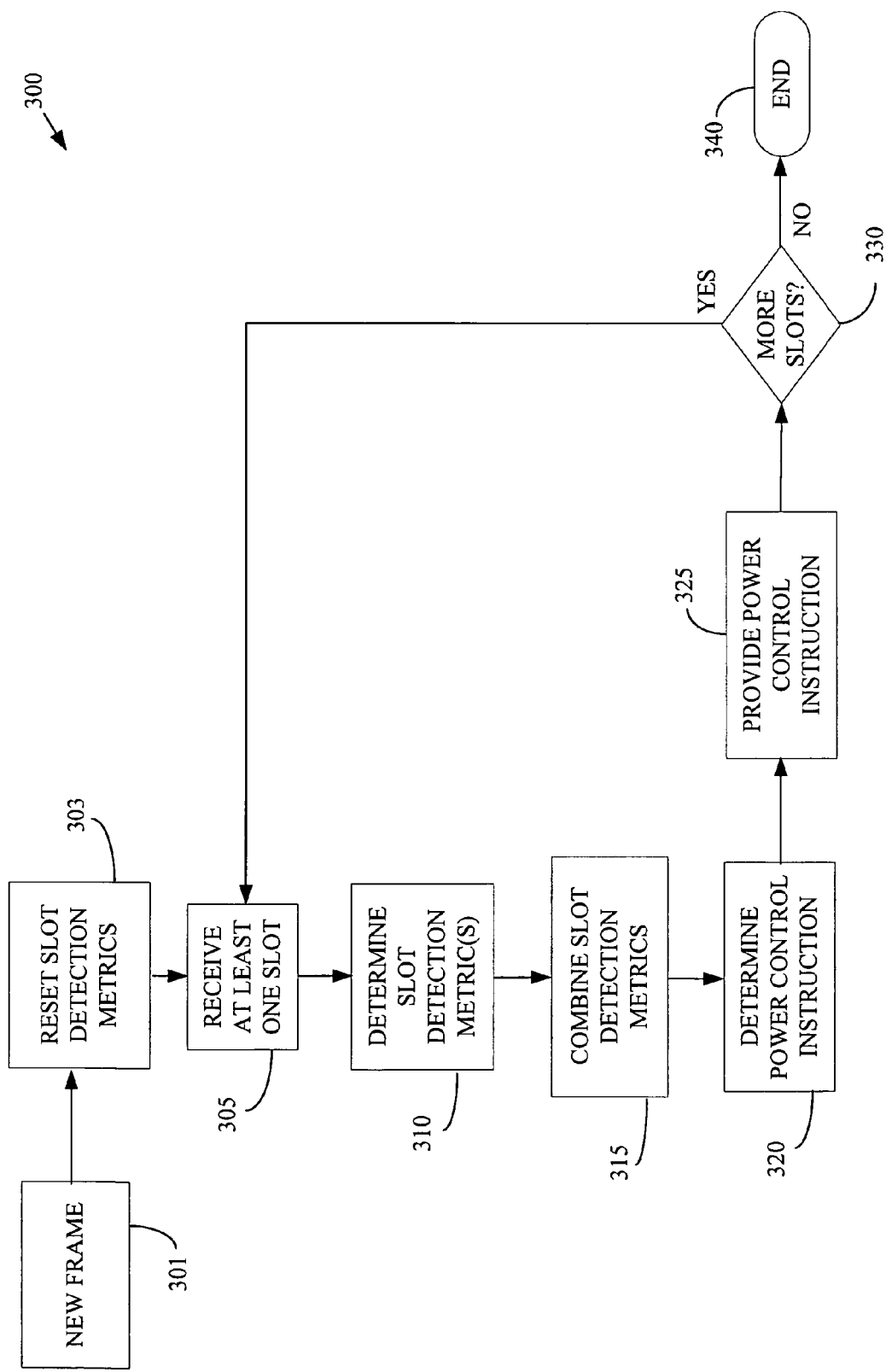
FIG. 3 conceptually illustrates a method of providing power control instructions, in accordance with the present invention.

FIG. 3 conceptually illustrates a method 300 of providing power control instructions. In the following description, mobile units and/or base stations such as those shown in FIGS. 1-2 will be referred to collectively as peers, in accordance with common usage in the art. Depending upon the circumstances, each peer may be referred to as a transmitting peer and/or a receiving peer. In the illustrated embodiment, the receiving peer detects (at 301) that a new frame is being received. The receiving peer then resets (at 303) one or more slot detection metrics associated with the frame. The receiving peer receives (at 305) one or more slots in a current frame being transmitted by the transmitting peer. As discussed above, each of the slots includes information that may be used to form one or more slot detection metrics. The receiving peer accesses (at 310) the slot detection metrics and, in one embodiment, combines (at 315) the plurality of slot detection metrics and determines (at 320) a desired power control instruction.

Figure 4:
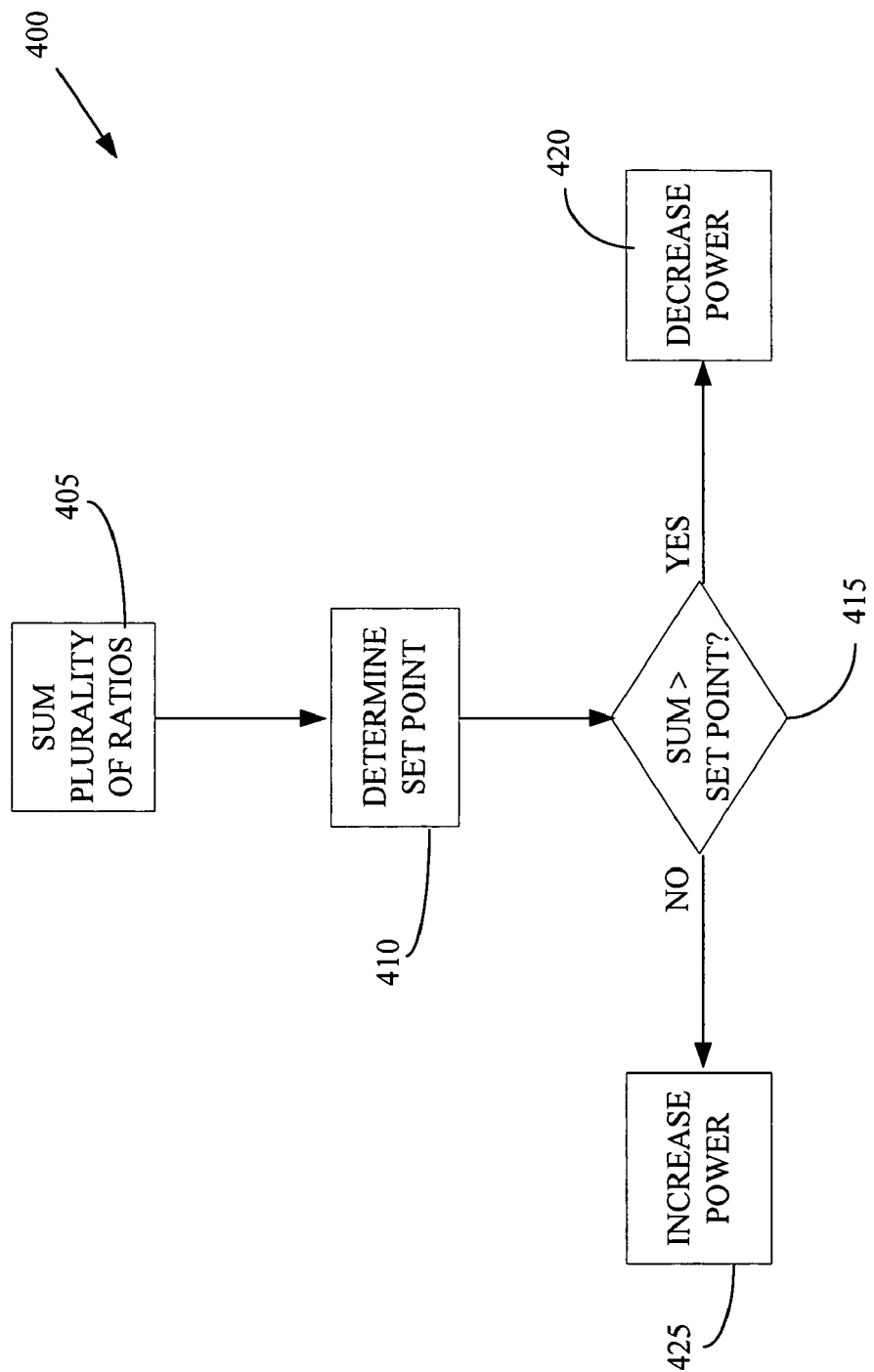
FIG. 4 conceptually illustrates one embodiment of a method of combining the slot detection metrics, in accordance with the present invention.

FIG. 4 conceptually illustrates one embodiment of a method 400 of combining the slot detection metrics, which may be used when combining (at 315) slot detection metrics and determining (at 320) the desired power control instruction, as described above with reference to FIG. 3. In the illustrated embodiment, the slot detection metrics are ratios of the chip energy to the noise power spectral density ($E_c/N_t$) associated with the plurality of slots included in the current frame. The pluralities of slot detection metrics are summed (at 405). In one embodiment, the slot detection metrics associated with all of the slots that have been received in the current frame until the current time (e.g., slots in the power control command decision window) are summed (at 405). For example, the summed slot detection metric, SM, may be given by the equation:

$$SM = \sum_{i=0}^{n} (E_c/N_t)_i^r,$$

where n is the number of slots that have been received so far and the superscript r indicates that this is a sum over received slots (with index i). However, the present invention is not limited to summing all of the received slots from the current frame. In one alternative embodiment, a selected number of recently received slots may be summed (at 405). For example, a window function may be applied to the received slots so that only the most recently received slots are summed (at 405). In another alternative embodiment, the slot detection metrics may be weighted by a weighting function and then the weighted slot detection metrics may be summed (at 405). For example, an exponential weighting function may be applied to the received slots so that the most recently received slots are weighted more heavily when summed (at 405). For another example, higher weights may be given to symbols that contain systematic bits in the code block and lower weights may be given to non-systematic or parity bits. A log of the SNR may also be used as a weighting function. As yet another alternative, the $(E_c/N_t)_i$ may be weighted by the amount of reliability of the metric, with higher reliability getting assigned a higher weight. In one embodiment, the reliability may be based on channel estimates, soft decision metrics, and the like.

In one embodiment, a set point associated with the slot detection metric is determined (at 410). For example, a plurality of normalized threshold values associated with a single slot detection metric may be summed (at 410) to form the set point specific to the slot number in question. For example, a normalized set point, SP, may be determined using the equation:

$$SP = (E_c/N_t)_i^s * n,$$

where the superscript s implies this is a set point value and n is the number of slots that have been received so far in the current frame. However, the present invention is not limited to summing normalized threshold values to form the set point. In alternative embodiments, any desirable threshold value, plurality of values, plurality of normalized values, and the like may be used to form the set point. For example, window functions, weighting functions, and the like may be applied to the threshold values before they are summed to determine (at 410) the set point. Although FIG. 4 shows the set point being determined (at 410) after the ratios are summed (at 405), the order of these actions is not material to the present invention.

The summed slot detection metric is then compared (at 415) to the set point. In the illustrated embodiment, the method 400 determines that the power in subsequent transmitted slots should be decreased (at 420) if the value of the summed slot detection metric is greater than the value of the set point. For example, if SM>SP, which may indicate that the frame is likely to be detected at the current transmission power using the received slots, the power in subsequent transmitted slots may be decreased (at 420). If the value of the summed slot detection metric is less than or equal to the value of the set point, the power used to transmit subsequent transmitted slots should be increased (at 420). For example, if SM<SP, which may indicate that the frame is not likely to be detected at the current transmission power using the received slots, thus the power in subsequent transmitted slots of the frame may be increased (at 420). However, persons of ordinary skill in the art should appreciate that any desirable criterion may be used to compare (at 415) the summed slot detection metric to the set point and thereby to determine whether or not to increase (at 425) or decrease (at 420) the power used to transmit subsequent transmitted slots.

Referring back to FIG. 3, determining (at 320) the power control instruction also includes determining a quantity indicative of the power control instruction. In one embodiment, determining (at 320) the power control instruction may include determining (at 320) a value of a power control bit that may be transmitted in one or more slots by the receiving peer. For example, the receiving peer may determine (at 320) that the value of the power control bit should be set to "1" when it is desirable to increase the transmission power by a predetermined step size for subsequently transmitted slots. For another example, the receiving peer may determine (at 320) that the value of the power control bit should be set to "0" when it is desirable to decreased the transmission power by a predetermined step size for subsequently transmitted slots.

The receiving peer provides (at 325) the power control instruction. In one embodiment, the receiving peer provides (at 325) a power control instruction bit to a transmitting peer over an air interface. In one embodiment, the transmitting peer then increases or decreases the transmission power for the subsequently transmitted slot of the current frame by a predetermined step size in response to receiving the power control instruction bit. However, persons of ordinary skill in the art should appreciate that the present invention is not limited to transmitting peers that increase or decrease the transmission power by a predetermined step size. In alternative embodiments, the transmitting peer may increase or decrease the transmission power by any desirable amount in response to receiving an instruction indicating that the transmission power should be increased or decreased.

The receiving peer may also determine (at 330) whether or not the current frame contains any more slots. If the frame contains one or more additional slots, the receiving peer may receive (at 305) the additional slots. In one embodiment, the receiving peer may then determine (at 310) one or more slot detection metrics using the newly received slot information, as well as any previously received slot information. If all the slots in the frame have been received (at 305), the method 300 may end (at 340). In some embodiments, the set point [$(E_c/N_t)_i^s$] may change for successive frames, e.g. after the method 300 ends (at 340). For example, some outer loop power control algorithms may change the set point after every frame based on whether the was successfully decoded or not. These changes may be accounted for in the computations of the thresholds in the formulations described above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling transmission power in a current slot of a frame, comprising:
    detecting a beginning of the frame;
    setting a summed slot detection metric associated with the frame to zero in response to detecting the beginning of the frame;
    accessing a plurality of slot detection metrics associated with a plurality of prior slots of the frame, each prior slot being used for transmission after the beginning of the frame and prior to transmission in the current slot, the plurality of slot detection metrics being determined based upon energy transmitted in the plurality of prior slots;
    adding each of the plurality of slot detection metrics to the summed slot detection metric associated with the frame; and
    determining a power control instruction for the current slot by comparing the summed slot detection metric to a set point that indicates a likelihood that the frame can be successfully decoded using the plurality of prior slots, the power control instruction being used to determine the transmission power for the current slot.

2. The method of claim 1, wherein accessing the plurality of slot detection metrics associated with the plurality of slots comprises accessing a plurality of slot detection metrics associated with slots received in a current frame.

3. The method of claim 1, wherein accessing the plurality of slot detection metrics comprises accessing a plurality of ratios of a chip energy to a noise power spectral density.

4. The method of claim 1, wherein accessing the plurality of slot detection metrics comprises accessing at least one of a plurality of chip energies and a plurality of decoder soft decision metrics.

5. The method of claim 1, wherein adding the plurality of slot detection metrics to the summed slot detection metric comprises adding the plurality of slot detection metrics to form a temporally non-local summed slot detection metric associated with the current slot.

6. The method of claim 5, wherein adding the plurality of slot detection metrics to the summed slot detection metric comprises having a plurality of normalized slot detection metrics to form a normalized summed slot detection metric.

7. The method of claim 5, wherein adding the plurality of slot detection metrics to the summed slot detection metric comprises summing all of the slot detection metrics associated with all the slots received in a current frame.

8. The method of claim 5, wherein adding the plurality of slot detection metrics to the summed slot detection metric comprises adding a plurality of slot detection metrics associated with a selected portion of the slots received in the frame.

9. The method of claim 5, wherein adding the plurality of slot detection metrics to the summed slot detection metric comprises:
    multiplying each of the plurality of slot detection metrics by a corresponding weight; and
    adding the plurality of weighted slot detection metrics to the summed slot detection metric.

10. The method of claim 1, wherein comparing the summed slot detection metric to the set point comprises comparing the summed slot detection metric to a set point selected so that the likelihood that the frame can be successfully decoded using the plurality of prior slots is about 99%.

11. The method of claim 10, comprising determining a normalized set point.

12. The method of claim 11, wherein determining the normalized set point comprises determining the set point based on a number of received slots.

13. The method of claim 1, wherein determining the power control instruction comprises determining a value of a power control bit.

14. The method of claim 1, comprising providing the power control instruction.

15. A method for controlling transmission power in a current slot of a current frame, comprising:
   detecting a beginning of the current frame:
   setting a summed slot detection metric associated with the current frame to zero in response to detecting the beginning of the current frame:
   accessing a plurality of ratios of a chip energy to a noise power spectral density, wherein the chip energy and the noise power spectral density in each ratio are associated with a corresponding one of a plurality of prior slots received in the current frame after the beginning of the current frame and prior to transmission of the current slot;
   adding each of the plurality of ratios to the summed slot detection metric; and
   determining a power control instruction for the current slot by comparing the summed slot detection metric to a set point that indicates a likelihood that the current frame can be successfully decoded using the plurality of prior slots, the power control instruction being used to determine the transmission power for the current slot.

16. The method of claim 15, wherein adding the plurality of ratios to the summed slot detection metric comprises summing the plurality of ratios to form a temporally non-local summed slot detection metric associated with the current slot.

17. The method of claim 16, wherein summing the plurality of ratios comprises summing a plurality of normalized ratios.

18. The method of claim 16, wherein summing the plurality of ratios comprises summing all of the ratios associated with all the slots received in the current frame.

19. The method of claim 16, wherein summing the plurality of ratios comprises summing a plurality of ratios associated with a selected portion of the slots received in the current frame.

20. The method of claim 16, wherein summing the plurality of ratios comprises:
   multiplying each of the plurality of ratios by a corresponding weight; and
   summing the plurality of weighted ratios.

21. The method of claim 15, wherein comparing the summed slot detection metric to a set point comprises comparing the summed slot detection metric to a set point selected so that the likelihood that the current frame can be successfully decoded using the plurality of prior slots is about 99%.

22. The method of claim 21, wherein determining the power control instruction comprises determining a power control instruction indicative of a decrease in transmitted power when the summed slot detection metric is greater than the set point.

23. The method of claim 21, wherein determining the power control instruction comprises determining a power control instruction indicative of an increase in transmitted power when the summed slot detection metric is less than or equal to the set point.

24. The method of claim 21, comprising determining a normalized set point.

25. The method of claim 15, comprising providing the power control instruction.

* * * * *